(12) United States Patent
Wang et al.

(10) Patent No.: US 11,165,084 B2
(45) Date of Patent: Nov. 2, 2021

(54) ZINC-IODINE BATTERY STRUCTURE

(71) Applicant: EAST CHINA NORMAL UNIVERSITY, Shanghai (CN)

(72) Inventors: Lianwei Wang, Shanghai (CN); Fangyao Shi, Shanghai (CN); Nanxi Shen, Shanghai (CN); Chunfang Xu, Shanghai (CN); Shaohui Xu, Shanghai (CN); Yiping Zhu, Shanghai (CN); Dayuan Xiong, Shanghai (CN); Shaoqiang Chen, Shanghai (CN); Junhao Chu, Shanghai (CN)

(73) Assignee: EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 16/764,860

(22) PCT Filed: Oct. 16, 2018

(86) PCT No.: PCT/CN2018/110553
§ 371 (c)(1),
(2) Date: May 16, 2020

(87) PCT Pub. No.: WO2019/095915
PCT Pub. Date: May 23, 2019

(65) Prior Publication Data
US 2020/0343570 A1    Oct. 29, 2020

(30) Foreign Application Priority Data

Nov. 17, 2017  (CN) .......................... 201711142958.4

(51) Int. Cl.
*H01M 8/18*  (2006.01)
*H01M 12/08* (2006.01)
*H01M 10/36* (2010.01)

(52) U.S. Cl.
CPC .......... *H01M 8/188* (2013.01); *H01M 10/365* (2013.01); *H01M 12/085* (2013.01)

(58) Field of Classification Search
CPC .. H01M 8/188; H01M 50/449; H01M 12/085; H01M 50/1385; H01M 10/365
See application file for complete search history.

(56) References Cited

U.S. PATENT DOCUMENTS

2015/0147673 A1* 5/2015 Li ........................ H01M 8/20
429/447
2018/0342771 A1* 11/2018 Li ........................ H01M 4/668

* cited by examiner

*Primary Examiner* — Stewart A Fraser
(74) *Attorney, Agent, or Firm* — Liang Legal Group, PLLC

(57) ABSTRACT

Disclosed in the invention is a zinc-iodine battery structure, which includes a housing, a cavity is formed in the housing, and a cation exchange membrane for dividing the cavity into two parts is disposed in a middle of the cavity; a glass fiber component for protecting the cation exchange membrane is disposed at a negative output end; a graphite felt impregnated with a $ZnI_2$ solution is disposed on an outside of the glass fiber component; and the graphite felt of the negative output end is coated with Bi powder, and a graphite felt of a positive output end is coated with Sm powder. Carbon plates serving as current leading-out channels of a battery are disposed on outsides of the graphite felts; and a return flow channel is disposed between the two graphite felts. By using a homogeneous cation exchange membrane with a low electrical resistance, a problem of serious self-discharging is overcome; and by using a flow battery with an open flow system, a problem of a change in pressure caused by a change in volume during charging and discharging is effectively solved. By disposing glass fiber products on two sides of the cation exchange membrane, a dendritic crystal generated during charging is unable to reach a separator, so that short circuit caused by puncture of the separator is avoided.

7 Claims, 1 Drawing Sheet

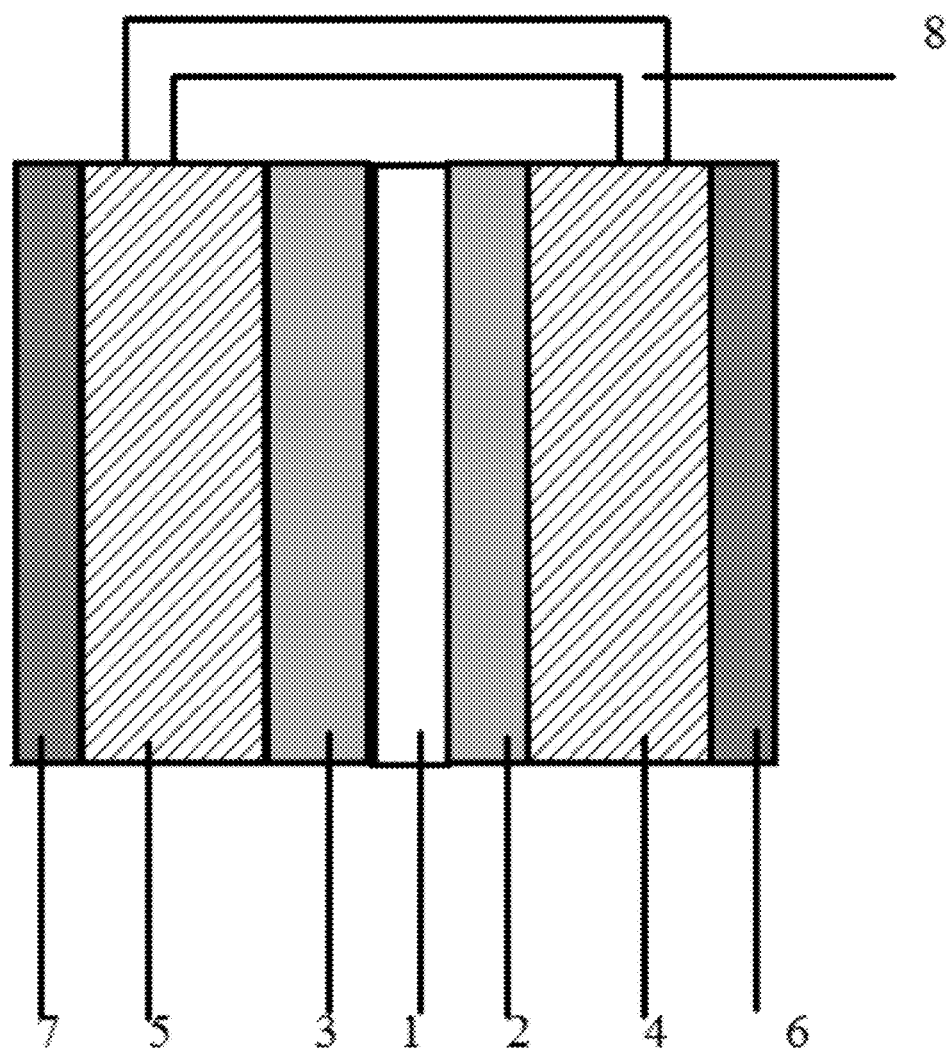

ZINC-IODINE BATTERY STRUCTURE

TECHNICAL FIELD

The present invention relates to a battery structure, in particular to a zinc-iodine battery structure and a method for manufacturing a zinc-iodine battery, which belongs to the field of material science and engineering.

BACKGROUND ART

A commonly used rechargeable battery (also called a secondary battery) in daily life includes a lead storage battery, a lithium ion battery, and the like, wherein the lead storage battery has a big advantage of low price, but lead is harmful to the environment, and many European countries have started to disable the lead storage battery. The lithium ion battery has an advantage of high energy density and is relatively environmentally friendly, but an organic electrolyte is easy to catch fire, while the lithium ion battery of a solid electrolyte is relatively high in cost and still immature. The two kinds of batteries also have a common disadvantage of limited circulation capacity, for example, the lead storage battery only has about 500 circulation times, and even the best lithium ion battery only has more than 2,000 circulation times at present. Therefore, there is an urgent need for a battery that is safe and environmentally friendly, and has a relatively high energy storage density, a relatively good circulation capacity and a relatively low cost, and a zinc-iodine battery may meet the requirements.

The zinc-iodine battery was initially reported by PNNL National Laboratory of Northwestern University, and what they manufactured was actually a zinc-iodine flow battery, which was published in Nature Communications 6, 6303 (2015). An energy density of the zinc-iodine flow battery is close to that of a lithium iron phosphate battery from an energy storage characteristic of a battery, but the flow battery is unable to be miniaturized due to characteristics of the flow battery.

We find two problems when modifying the zinc-iodine flow battery and trying to get rid of restriction of a flow device. (1) How to overcome a problem of serious self-discharging? (2) A change in pressure is caused by a change in volume during charging and discharging. We know that water may be weakly ionized, $H_2O \leftarrow \rightarrow OH^- + H^+$, while $OH^-$ is a complexing agent of $Zn^{2+}$, so that a $[Zn(OH)_n]^{2-n}$ (wherein n=1, 2, 3, 4, 5) complex is formed, in this way, $Zn^{2+}$, $[Zn(OH)]^+$ and $H^+$ may all enter the other pole through a cation exchange membrane under driving of an electric field force during charging or discharging, while $[Zn(OH)]^+$ is unstable and very easy to become $[Zn(OH)]^+ \leftarrow \rightarrow Zn^{2+} + OH^-$ and $OH^- + H^+ \rightarrow H_2O$, which is equivalent to bringing a water molecule to the other pole separated by the cation exchange membrane while exchanging zinc ions, the water molecule is brought from a positive electrode to a negative electrode during charging and brought from the negative electrode to the positive electrode during discharging, this change leads to a change in water volume at the positive and negative electrodes, thus leading to the change in volume and eventually leading to the change in pressure, and the higher the concentration of $ZnI_2$ is, the larger the change is. If there is no effective method to deal with this characteristic, not only increase of the concentration of $ZnI_2$ is limited, which also means that increase of the energy density is limited, but also the battery is very easy to be damaged. In addition to the two main problems, a problem of a dendritic crystal faced by a general zinc battery also needs to be considered. In addition, a working voltage of the zinc-iodine battery is relatively close to an electrochemical window of water, so that hydrogen and oxygen are very easy to be generated at both electrodes during charging. Therefore, a hidden danger is brought to a safety of the battery manufactured.

SUMMARY OF THE INVENTION

The present invention is intended to provide a zinc-iodine battery structure and a method for manufacturing a zinc-iodine battery to solve the above problems in the prior art.

The objective of the present invention is achieved by the following technical solutions.

A zinc-iodine battery structure includes a housing, a cavity is formed in the housing, and a cation exchange membrane for dividing the cavity into two parts is disposed in a middle of the cavity; glass fiber components for protecting the cation exchange membrane are disposed on both sides of the cation exchange membrane; graphite felts impregnated with a $ZnI_2$ solution are disposed on outsides of the glass fiber components; the graphite felt of a negative output end is evenly coated with Bi powder less than 300 meshes (0.5 $mg/cm^2$ to 1.5 $mg/cm^2$, with a total amount of about one thousandth of an amount of zinc iodide), and the graphite felt of a positive output end is coated with Sm powder less than 300 meshes (0.5 $mg/cm^2$ to 1.5 $mg/cm^2$, with a total amount of about one thousandth of an amount of zinc iodide); and a problem of a bubble that often occurs during charging may be solved by this measure. Carbon plates serving as current leading-out channels of a battery are disposed on outsides of the graphite felts; and a return flow channel is disposed between the two graphite felts; and the return flow channel has a length-diameter ratio greater than 10 and a diameter ranging between 0.5 mm and 1.5 mm, which is a key to solve a change in pressure during charging and discharging.

The housing of the battery is made of PVC plastic.

The cation exchange membrane is a homogeneous cation exchange membrane.

The glass fiber component is selected from a glass felt or a glass cloth.

A glass felt with a thickness of about 1 mm to 10 mm is used as the glass fiber component to protect the cation exchange membrane and is used for inhibiting growth of a dendritic crystal.

The $ZnI_2$ solution has a molarity of 1 mol/l to 5 mol/l.

The $ZnI_2$ solution is added with alcohol with a volume of 1/10 of a total volume, and a concentration and a function of the alcohol are stated.

A volume of a negative electrode decreases inevitably when a volume of a positive electrode increases according to a change rule of the volumes of the positive and negative electrodes, and vice versa. Moreover, assuming that a system pressure is unchanged, a total volume of the positive and negative electrodes remains basically unchanged. We consider whether the return flow channel is able to be established between the positive and negative electrodes to enable water brought away by zinc ions to return, thus compensating for a pressure difference brought about by the change in volume caused by water molecules passing through a separator with zinc ions (this device is also called a pressure regulating bypass device), such a channel requires that a liquid is able to flow through but an electrical resistance is relatively large, and that is to say, a conductivity is relatively poor, so as not to cause electrical leakage or short circuit. In this way, the problem may be solved by designing a geometrical shape of the return flow channel (such as a width, the length-diameter ratio and other factors).

The zinc-iodine battery designed according to the technical solutions of the present invention has the following beneficial effects.

1. The homogeneous cation exchange membrane with a small electrical resistance only allows positive ions to pass through, thus effectively reducing self-discharging, so that a problem of serious self-discharging is overcome.

2. The present invention is a non-flow battery, which omits a complicated flow system, so that the zinc-iodine battery may be applied to daily life like a dry battery.

3. By disposing glass fiber products on two sides of the cation exchange membrane, the dendritic crystal generated during charging is unable to reach the separator, so that short circuit caused by puncture of the separator is avoided, which means that a problem of the dendritic crystal may be solved. That is to say, the problem of the dendritic crystal may be solved by protecting the separator with the glass fiber products (the glass felt or the glass cloth).

4. The graphite felt of the negative electrode output end is evenly coated with ultra-fine (less than 300 meshes) Bi powder (0.5 mg/cm$^2$ to 1.5 mg/cm$^2$, with a total amount of about one thousandth of an amount of zinc iodide), while the graphite felt of the positive electrode output end is coated with ultra-fine (less than 300 meshes) Sm powder (0.5 mg/cm$^2$ to 1.5 mg/cm$^2$, with a total amount of about one thousandth of an amount of zinc iodide). The problem of the bubble that occurs during charging is effectively solved.

BRIEF DESCRIPTION OF THE DRAWINGS

FIG. 1 is a structure diagram of the present invention.

In the drawing, 1 refers to cation exchange membrane, 2 and 3 refer to glass fiber components, 4 and 5 refer to graphite felts, 6 and 7 refer to carbon plates, and 8 refers to return flow channel.

DETAILED DESCRIPTION

The technical features of the present invention are further described with reference to the drawing and the specific embodiments.

As shown in FIG. 1, a zinc-iodine battery structure includes a housing, a cavity is formed in the housing, and a cation exchange membrane for dividing the cavity into two parts is disposed in a middle of the cavity; glass fiber components for protecting the cation exchange membrane are disposed on both sides of the cation exchange membrane; graphite felts impregnated with a ZnI$_2$ solution are disposed on outsides of the glass fiber components; carbon plates serving as current leading-out channels of a battery are disposed on outsides of the graphite felts; a return flow channel is disposed between the two graphite felts; and the return flow channel has a length-diameter ratio greater than 10 and a diameter ranging between 0.5 mm and 1.5 mm, which is a key to solve a change in pressure during charging and discharging.

The housing of the battery is made of PVC plastic.

The cation exchange membrane is a homogeneous cation exchange membrane.

The glass fiber component is selected from a glass felt.

A glass felt with a thickness of about 1 mm to 10 mm is used as the glass fiber component to protect the cation exchange membrane and is used for inhibiting growth of a dendritic crystal.

The graphite felts need to be processed as follows: the graphite felt of the negative electrode output end is evenly coated with ultra-fine (less than 300 meshes) Bi powder (0.5 mg/cm$^2$ to 1.5 mg/cm$^2$, with a total amount of about one thousandth of an amount of zinc iodide), while the graphite felt of the positive electrode output end is coated with ultra-fine (less than 300 meshes) Sm powder (0.5 mg/cm$^2$ to 1.5 mg/cm$^2$, with a total amount of about one thousandth of an amount of zinc iodide).

The ZnI$_2$ solution has a molarity of 1 mol/l to 5 mol/l.

The ZnI$_2$ solution is added with alcohol with a volume of 1/10 of a total volume to improve a solubility of iodine.

In terms of chemical agents, ZnI$_2$ is purified, and a positive electrode needs to be added with an analytically pure iodine I$_2$ with an amount of twice the total molar number of zinc iodide. A concentration of the ZnI$_2$ solution may be 1 mol/l to 5 mol/l, and anhydrous ethanol of 1/10 of a total volume of the ZnI$_2$ solution needs to be added to the solution.

A single battery is charged according to a principle of limiting a current first (a current density less than 15 mA/cm$^2$ is recommended) and then limiting a constant voltage (a voltage less than 1.36 V is recommended). It is noted that the voltage is about 1.3 V, a storage capacity of the battery is proportional to a concentration of zinc iodide, and a storage density of 5 mol/l ZnI$_2$ electrolyte has been close to that of a lithium ion battery. In addition, a circulation capability of charging and discharging of the battery may also reach thousands of times.

We also find that the battery has no over-discharging problem, because even after over-discharging, the battery is easy to recover according to a current-limiting and voltage-limiting mode, which is beyond the reach of most secondary batteries.

What is claimed is:

1. A zinc-iodine battery structure, comprising a housing, a cavity being formed in the housing, wherein a cation exchange membrane for dividing the cavity into two parts is disposed in a middle of the cavity; a glass fiber component for protecting the cation exchange membrane is disposed at a negative output end; a graphite felt impregnated with a ZnI$_2$ solution is disposed on an outside of the glass fiber component; the graphite felt of the negative output end is evenly coated with Bi powder less than 300 meshes, and a graphite felt of a positive output end is coated with Sm powder less than 300 meshes; carbon plates serving as current leading-out channels of a battery are disposed on outsides of the graphite felts; a return flow channel is disposed between the two graphite felts; and the return flow channel has a length-diameter ratio greater than 10 and a diameter ranging between 0.5 mm and 1.5 mm.

2. The zinc-iodine battery structure according to claim 1, wherein the housing of the battery is made of PVC plastic.

3. The zinc-iodine battery structure according to claim 1, wherein the cation exchange membrane is a homogeneous cation exchange membrane.

4. The zinc-iodine battery structure according to claim 1, wherein the glass fiber component is selected from a glass felt or a glass cloth.

5. The zinc-iodine battery structure according to claim 1, wherein a glass felt with a thickness of about 1 mm is used as the glass fiber component to protect the cation exchange membrane.

6. The zinc-iodine battery structure according to claim 1, wherein the ZnI$_2$ solution has a molarity of 1 mol/l to 5 mol/l.

7. The zinc-iodine battery structure according to claim 1, wherein the $ZnI_2$ solution is added with alcohol with a volume of 1/10 of a total volume.

\* \* \* \* \*